United States Patent [19]

Hanakata et al.

[11] 4,134,696

[45] Jan. 16, 1979

[54] PRINTING APPARATUS

[75] Inventors: Takayoshi Hanakata, Yokohama; Atsushi Noda, Kawasaki; Mitsuaki Seki, Tokyo, all of Japan

[73] Assignee: Canon Kabushiki Kaisha, Tokyo, Japan

[21] Appl. No.: 744,275

[22] Filed: Nov. 23, 1976

[30] Foreign Application Priority Data

Dec. 5, 1975 [JP] Japan ............................... 50-145283
Dec. 5, 1975 [JP] Japan ............................... 50-145284

[51] Int. Cl.[2] ............................................ G01D 15/10

[52] U.S. Cl. .................................... 400/323; 400/121; 346/76 R

[58] Field of Search ..................... 197/1 R; 101/93.04, 101/93.05; 346/76, 131; 219/216

[56] References Cited

U.S. PATENT DOCUMENTS

| | | | |
|---|---|---|---|
| 2,911,085 | 11/1959 | Leathers | 197/1 R |
| 3,632,970 | 1/1972 | Walkow | 219/216 |
| 3,845,850 | 11/1974 | Herr et al. | 197/1 R |
| 3,874,492 | 4/1975 | Hurst | 197/1 R |
| 3,949,851 | 4/1976 | Phelan | 197/1 R |
| 3,999,644 | 12/1976 | Pape et al. | 197/1 R |
| 4,010,835 | 3/1977 | Martin et al. | 197/1 R |

*Primary Examiner*—E. H. Eickholt
*Attorney, Agent, or Firm*—Fitzpatrick, Cella, Harper & Scinto

[57] ABSTRACT

The printing apparatus includes a printing head moving forward and backward. The printing head is, when moving, inclined at a predetermined angle with respect to recording paper. The direction of the inclination is changed when the direction of movement of the head is reversed so that printing may be carried out in either direction, forward or backward.

6 Claims, 13 Drawing Figures

PRINTING APPARATUS

BACKGROUND OF THE INVENTION

The present invention relates to a printing apparatus, more particularly to the type of printing apparatus in which a printing head moves on recording paper to print.

SUMMARY OF THE INVENTION

The object of the invention is to provide novel printing apparatus of the type mentioned above which provides adequate protection to the recording paper, improvement of printing quality, reduction of the head contact pressure and miniaturization of the motors for driving the head and feeding the recording paper, by moving the head at an inclination with respect to the paper.

A further object of the present invention is to provide a novel printing apparatus of the type mentioned above which provides adequate protection of the recording paper, substantial increase in printing speed and improvement of durability of the printing head, by changing the inclination of the head with respect to the recording paper when the direction of the movement of the printing head is reversed.

DESCRIPTION OF THE PREFERRED EMBODIMENTS

Figure 1:
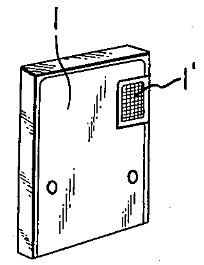
FIG. 1 shows an example of a printing head used in the apparatus according to the invention.
Figure 2:
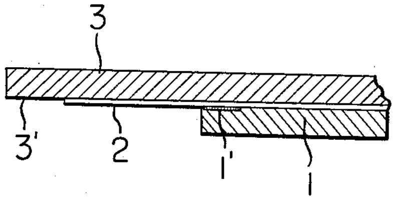
FIG. 2 illustrates the plane contact condition of the head with recording paper.
Figure 3:
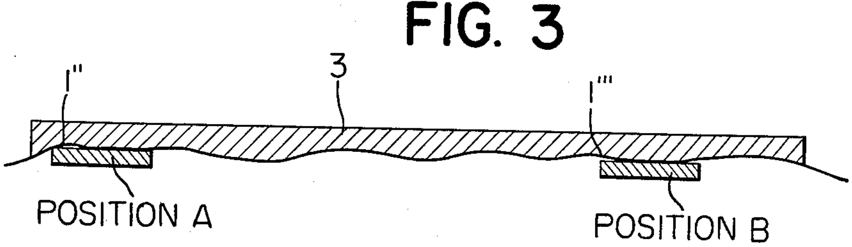
FIG. 3 illustrates another condition of the contact in which the pad is deformed.
Figure 4:
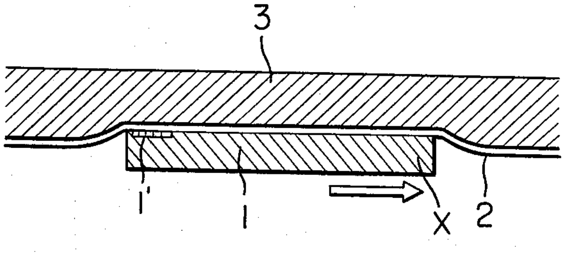
FIG. 4 illustrates another condition of the contact in which the recording paper is damaged.

Referring to FIG. 1 there is shown a printing head 1 for a thermal printer. Printing is effected by moving the printing head 1 with its heating part 1' kept in close contact with recording paper 2 as illustrated in FIG. 2. Therefore it is essential that the surface of the printing head as well as that of a pad 3 should always be flat and that the optimum contact pressure should be maintained. However, since the pad is usually made of organic elastic material, there often occurs deformation of it. The deformed pad prevents the heating part 1' from making enough contact with the recording paper as illustrated in FIG. 3. At position A, relatively good printing is obtainable, but at position B where the heating part 1' is separated from the recording paper, printing is no longer effected or only a faint print is produced. Furthermore, there is another problem regarding contact pressure. For the pad 3 of 2mm in thickness made of neoprene rubber of 30° in rubber hardness, the contact pressure of the heating part 1' should be at least within the range of from 100 to 150g. This means that the whole head 1 has to be pressed with a strong force ranging from 500 to 1500g. Pressed by such a large force, the pad 3 and the recording paper will be deformed as illustrated in FIG. 4. Under this condition the movement of the head 1 will cause damage of the heat-sensitive layer of the recording paper 2 at the edge portion (a) of the head. Also, heat-fusible particles produced by the damage will stick to the vicinity of the heating part 1' and form a solid obstacle which causes degradation of printing quality. Also, due to the obstacle, resistance against the movement of the printing head is increased which in turn requires the use of a high power and large stepping motor for driving it.

To obviate these inconveniences, a solution is proposed according to which the edge portion (b) of the printing head (see FIG. 5) is inclined forming an angle $\theta$ with respect to the direction of movement of the head 1 indicated by arrow C. This solution enables the heating part 1' to follow the deformation of the pad 3 and keep contact with it even when the pad 3 is deformed as illustrated in FIG. 3. Furthermore, since the area of the head contiguous to the pad is restricted to the heating part 1' only, the necessary contact pressure may be lowered to the range from 200 to 500g or less and in addition it is allowed to apply the possible highest contact pressure to the portion of the heating part 1'.

Figure 6:
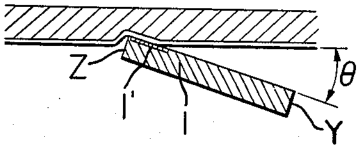
FIG. 6 illustrates the case where too large inclination is selected.

The inclination angle $\theta$ of the head with respect to the recording paper should be selected adequately. If a too large angle is selected as shown in FIG. 6, a character to be printed in the form of 5×7 matrix, for example, will contact the recording paper only at its left-hand edge, and the right-hand portion will be spaced from the paper. As a result, the character may be printed with its right-hand portion missed or vague. Also, the edge portion (c) may damage the heat sensitive layer and, in the worst case, even the subtrate of the recording paper. On some occasions, the printing head may be subjected to hard abrasion and its durability may be descreased. For the above reasons, it has been found that a preferable range of angle $\theta$ is 30' - 5°, and about 2° is most suitable for the pad of 25 to 60 of rubber hardness measured by a JIS (Japanese Industrial Standards) type durometer.

Figure 11:
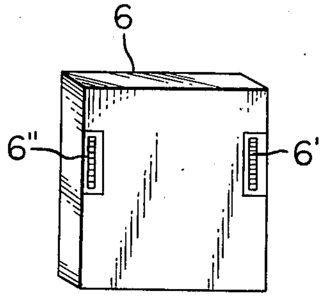

However, for another type of printing head, for example, a thermal head having only one row of seven dots as illustrated in FIG. 11, a larger value of angle $\theta$ is allowable, for example, a value up to some 15°. A preferable range of angle $\theta$ for this type of head is about 2° - 5°.

Figure 5:
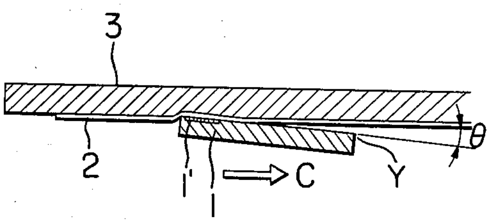
FIG. 5 illustrates the head according to the invention inclined with respective to the recording paper.

It should be noted that when the printing head is moved being inclined against the recording paper as illustrated in FIG. 5, it becomes impossible to move it in the reversed direction.

The present invention has overcomed those drawbacks. According to the invention, there is provided means for separating the head 1 from the recording paper 2 or changing the direction of inclination of the head 1 when the head is moved in the direction opposite to that of arrow C.

Figure 7:
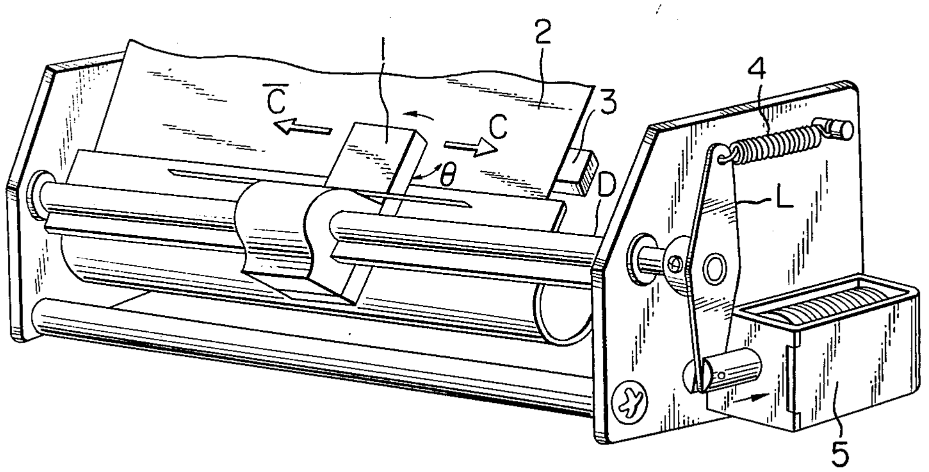
FIG. 7 is a perspective view of the printing apparatus embodying the invention.

FIG. 7 shows an example of the system in which the head 1 is separated from the recording paper when returned. During the movement of the head 1 in the punting direction when, for example, to the right, the optimum contact pressure is maintained by means of a spring 4, a lever L and a shaft D. When the head is returned (to the left), a solenoid 5 is actuated to pivot the lever L which in turn drives the shaft D, which is fixed to the lever, into rotation so that the head may be separated from the recording paper and returned to its starting position smoothly. In a similar manner, the direction of inclination of the head 1 may be reversed when returning.

Lately in this technical field, there is a growing tendency to have one line printed while the head is returning, for the purpose of further increasing printing speed.

Figure 8:
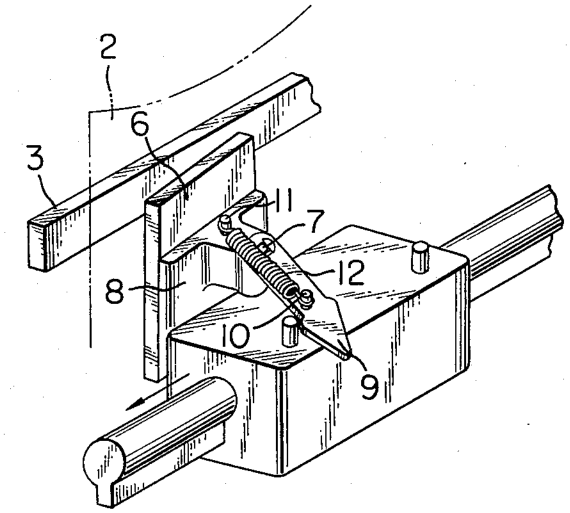
FIGS. 8 and 9 show another embodiment of the invention.
Figure 9:
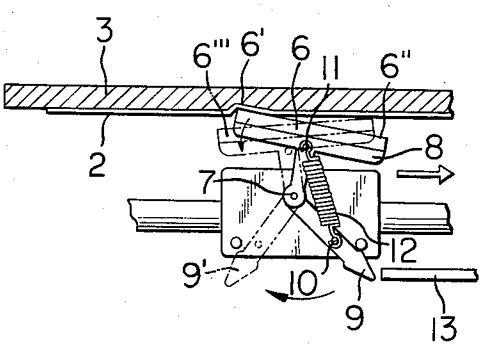

FIGS. 8 and 9 show a thermal printer in accordance with the invention which permits printing in either direction of head movement, to the left (FIG. 8) and to the right (FIG. 9).

Figure 10:
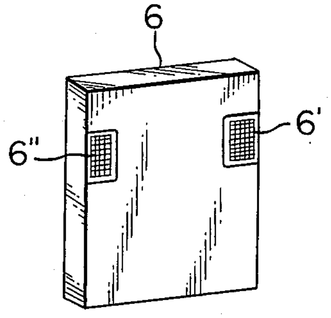
FIGS. 10 and 11 show examples of printing heads adoptable for the apparatus according to the invention.

FIGS. 10 and 11 show thermal heads used in this apparatus as shown in FIGS. 8 and 9. As seen from the drawings, these thermal heads have two heating parts: one is on the left-hand portion of the printing head and another on the right-hand. Therefore, with the movements of the head in either direction, printed characters become visible at each next step after they have been printed, as is a particular advantage of this type of thermal head.

In FIGS. 8 through 11, reference numeral 6 designates a thermal head having two heating parts 6' and 6'' one on each side. The head 6 is mounted on a heat sink 8 that is pivotable about a pivot 7. Also, pivotable about the same pivot 7, there is a lever 9 having a dowel 10 on which one end of a coil spring 12 is secured, the other end thereof being fastened to a dowel 11 on the heat sink 8. The attitude of the head 6 is determined by the clockwise or counterclockwise movement of the lever 9. As a means for changing the attitude, there is provided an arm 13 on the stationary part of the printer (see FIG. 9). For the movement of the head indicated by the arrow → in FIG. 9, the arm 13 prevents the lever 9 from being moved further. Therefore, during this movement of the head, the lever remains stopped, and after the head has moved some distance, the relative position of the lever to the head is changed to position 9' illustrated by the phantom line. As a result, the attitude of the head is changed to position 6''' by the action of the coil spring 12.

Figure 12:
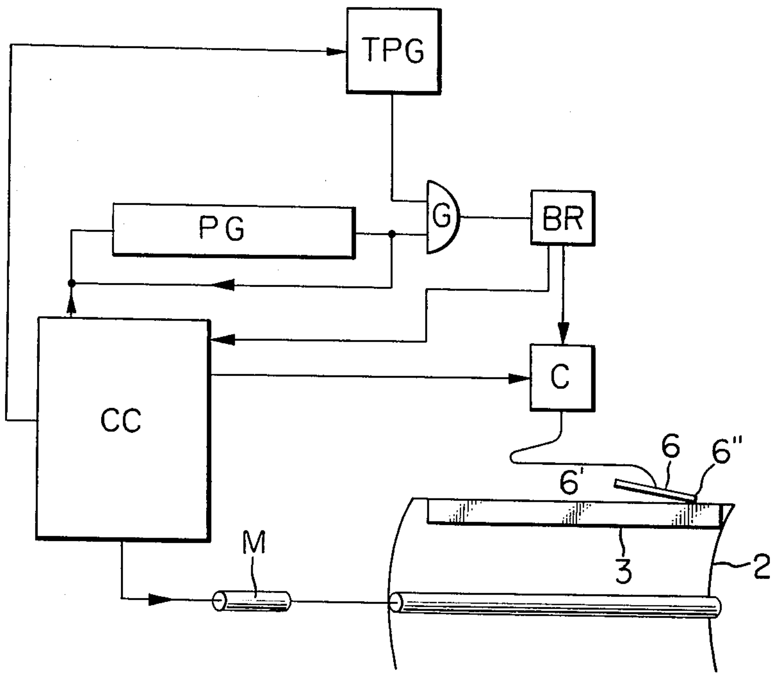
FIG. 12 is a block diagram showing a control system applicable to the apparatus according to the invention.

FIG. 12 shows a block diagram of a control system for a printer having such a printing head as shown in FIGS. 10 and 11.

In the drawing, PG designates a register in which information of characters to be printed is recirculatedly stored in the binary coded form. BR designates a buffer register that stores binary information of a digit or a row in a digit. G indicates an AND gate, which is adapted to pass the data from register PG to buffer register BR under the control of a timing pulse generator TPG. C designates a printing circuit including a decoder and a head deflection control. CC is a printing control and M a stepping motor.

Figure 13:
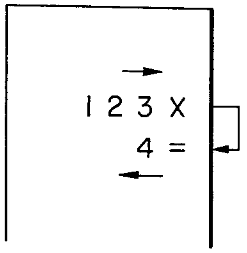
FIG. 13 illustrates an example of printing.

Assuming that printing data, such as "123X", is stored in the register PG in the binary coded form, the timing pulse generator TPG controls the gate G so as to make the data transfer to the buffer register in the order of "1", "2", "3" and "X", and then the heating part 6' will print the data in the same order as shown in FIG. 13. When the control circuit CC detects that the last character "X" has been stored and the printing has been completed, it sends an order to the printing circuit C to deflect the head. At the same time, the control circuit CC sends an order to the stepping motor to drive it so that the recording paper 2 may be fed by one line. Upon the completion of printing one line, the head is now in contact with the paper 2 at its heating part 6''. Assuming that, the printing data of the next line, such as "4 =", is stored in register PG, the data is transferred to the buffer register BR in the order of "=" and "4" under the control of timing pulse generator TPG and then printed in this order as illustrated in FIG. 13.

In this manner, according to the present invention printing is also effected during the returning of the head and, therefore, the printing speed will be increased remarkably. Furthermore, since two heating parts are used alternately, the life time of the head will be lengthened and its durability increased. It will be obvious that instead of the arm 13 other suitable driving source, such as an electromagnet mounted on the head may be used to change the inclination of the head. This arrangement allows the next line to be printed rapidly from any printing position by the return command from control circuit CC.

Having described the specific embodiments of the invention, it is to be understood that various modifications and changes may be made in the invention without departing from the spirit and scope of the invention.

What is claimed is:

1. A printing apparatus comprising:

a thermal head having a first edge portion and a second edge portion positioned on the opposite margin of the same side of the head from said first edge portion, and a plurality of thermal elements disposed on said first edge portion;

means for holding said thermal head such that the plurality of thermal elements on the first edge portion of said thermal head may be brought into pressure contact with a recording medium, and the second edge portion of said thermal head is spaced from the recording medium with such an inclination that there is provided a predetermined angle $\theta$ between said second edge portion and the recording medium centering on said first edge portion wherein said angle $\theta$ is selected within the range from 30 minutes to 15 degrees; and control means for causing said thermal head holding means to move in the direction across the width of the recording medium while said second edge portion of said thermal head is selected as a leading edge, while printing is performed on the recording medium by the contacting thermal head.

2. A printing apparatus according to claim 1, wherein a plurality of thermal elements are disposed on said second edge portion of said thermal head.

3. A printing apparatus comprising:

a thermal head having a first edge portion and a second edge portion positioned on the opposite margin of the same side of the head from said first edge portion, and wherein a plurality of thermal elements are disposed on said first edge portion;

means for holding said thermal head such that the plurality of thermal elements on the first edge portion of said thermal head may be brought into pressure contact with a recording medium, and the second edge portion of said thermal head is spaced from the recording medium; and control means for causing said thermal head holding means to move in the direction across the width of the recording medium while said second edge portion of said thermal head is selected as a leading edge, while printing is performed on the recording medium by the contacting thermal head.

4. A printing apparatus according to claim 3, wherein a plurality of thermal elements are disposed on said second edge portion of said thermal head.

5. A printing apparatus comprising:

a thermal head having a first edge portion and a second edge portion positioned on the opposite margin of the same side of the head from said first edge portion, and wherein a plurality of thermal elements are disposed on each of said first and second edge portions;

means for holding said thermal head such that the first and second edge portions of said thermal head are alternatively selected to bring the plurality of thermal elements into pressure contact with a recording medium, the non-selected edge portion of said thermal head being spaced from the recording medium with such an inclination that there is provided a predetermined angle $\theta$ between said non-selected edge portion and the recording medium centering on said selected edge portion wherein said angle $\theta$ is selected within the range from 30 minutes to 15 degrees; and control means for causing said thermal head holding means to move in the direction across the width of the recording medium while said non-selected edge portion of said thermal head is selected as a leading edge, while printing is performed on the recording medium by the selected thermal head.

6. A printing apparatus according to claim 5, wherein said control means includes a control circuit for alternatively applying print information, such as numerals, symbols and characters, to the respective thermal elements of a group disposed on said first and second edge portions of said thermal head.

* * * * *

UNITED STATES PATENT AND TRADEMARK OFFICE

CERTIFICATE OF CORRECTION

PATENT NO. : 4,134,696

DATED : January 16, 1979

INVENTOR(S) : TAKAYOSHI HANAKATA, ET AL

It is certified that error appears in the above-identified patent and that said Letters Patent are hereby corrected as shown below:

Column 2, line 68, "punting" should read --printing--.

Signed and Sealed this

*First* Day of *May 1979*

[SEAL]

*Attest:*

RUTH C. MASON
*Attesting Officer*

DONALD W. BANNER
*Commissioner of Patents and Trademarks*